(No Model.)
P. S. REEVES.
JOURNAL BEARING.
No. 314,476. Patented Mar. 24, 1885.
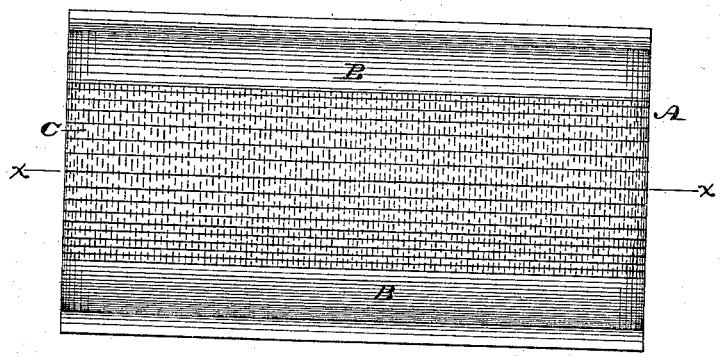
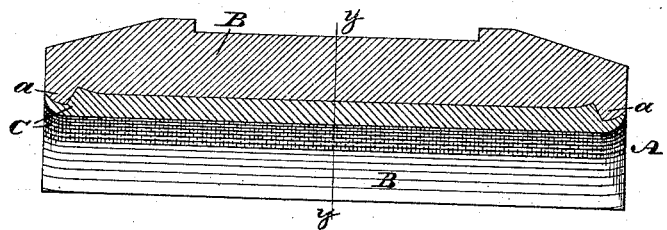
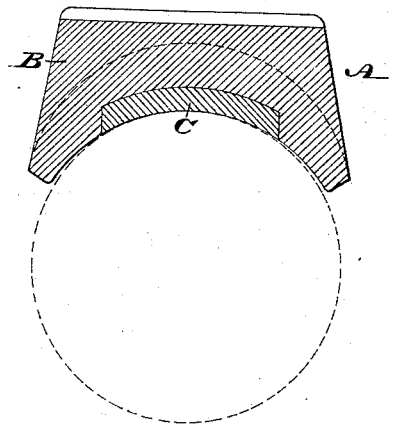
WITNESSES:
INVENTOR:
Paul S. Reeves
BY
ATTORNEY.

United States Patent Office.

PAUL S. REEVES, OF PHŒNIXVILLE, PENNSYLVANIA.

JOURNAL-BEARING.

SPECIFICATION forming part of Letters Patent No. 314,476, dated March 24, 1885.

Application filed August 14, 1884. (No model.)

*To all whom it may concern:*

Be it known that I, PAUL S. REEVES, a citizen of the United States, residing in Phœnixville, in the county of Chester, State of Pennsylvania, have invented a new and useful Improvement in Journal-Bearings, which improvement is fully set forth in the following specification and accompanying drawings, in which—

Figure 1 is a face view of a journal embodying my invention. Fig. 2 is a longitudinal section thereof in line *x x*, Fig. 1. Fig. 3 is a transverse section in line *y y*, Fig. 2.

Similar letters of reference indicate corresponding parts in the several figures.

My invention consists in providing a journal-box with a lining or wearing-surface of anti-friction metal, the same being flush with the remaining portion of the face of the box, the curvature of the entire face being greater than of the journal, so that the journal readily embeds itself in the lining, and the lining is made of less width than heretofore and remains firmly in position.

It further consists in making the recess in the bearing of such a form as to more firmly secure the filling therein.

It also consists in extending the lining beyond the front and rear ends of the recess in the box, so as to provide a surface of anti-friction metal at the extreme ends of the box and prevent contact of the journal with the hard metal at said ends.

Referring to the drawings, A represents a journal-bearing formed of a hard-metal portion, B, and lining C, of anti-friction or soft metal. The face of the portion B is recessed or depressed to receive the lining C, the parts of the recess toward the ends being of greater depth than the central portion thereof, as shown in Fig. 2, thus permitting a greater thickness of the filling at the ends for more firmly securing it within the walls of the recess. The walls *a* are sloped on both the inner and outer surfaces, the sloped form adding to the security of the attachment of the filling. The metal of the lining is continued beyond the front and rear ends of the recess, so as to overlap the walls *a* of the bearing at said ends, and thus form a lining which is continuous from end to end of the bearing. The curvature of the lining is coincident with that of the exposed parts of face of the portion B, the curvature being unbroken from side to side of the bearing, and the curvature of the face of the bearing as formed is greater than that of the journal, as is most clearly seen in Fig. 3. Consequently when the bearing and journal are in position the journal embeds itself centrally in the lining C, and is in contact with the same from end to end of the bearing, so that it is removed from contact with the hard-metal portion B at the end thereof, and the wearing action of the journal is uniform at its point of contact with the bearing throughout the entire length thereof. Again, as the lining is flush with the exposed face of the portion B and the curvatures thereof coincide, said lining is made of less width than heretofore, and the metal of the lining abuts firmly against the side walls of the recess which contains it without liability to work over said walls and become displaced. It will be seen that by making the soft lining flush with the hard metal of the box the journal will find a bearing on both lining and hard metal before the soft metal is entirely worn through.

Having thus described my invention, what I claim as new, and desire to secure by Letters Patent, is—

1. A journal-bearing formed of hard metal, having a recess on the face thereof and a lining of anti-friction or soft metal, said recess having its end portions of a greater depth than the central part thereof, substantially as described.

2. A journal-bearing formed of hard metal, having a recess on the face thereof and a lining of anti-friction or soft metal entering the same and continuing over the double-sloping front and rear walls thereof to the ends of the bearing, substantially as described.

3. A journal-bearing formed of hard metal, having a lining of anti-friction or soft metal entering a recess on the face thereof and continuing over the double-shaped walls at the front and rear ends thereof to the ends of the bearing, said lining being flush with the exposed parts of the face of the hard-metal portion and the curvatures of the said parts being coincident, the said recess having its end portions of a greater depth than the central part thereof, substantially as described.

PAUL S. REEVES.

Witnesses:
JOHN A. WIEDERSHEIM,
W. F. KIRCHER.